United States Patent [19]

Lindner et al.

[11] Patent Number: 5,711,406
[45] Date of Patent: Jan. 27, 1998

[54] FRICTION CLUTCH FOR THE TRANSMISSION OF A MOTOR VEHICLE AND A FLYWHEEL ASSEMBLY FOR A FRICTION CLUTCH

[75] Inventors: Joachim Lindner, Schweinfurt; Bernhard Schierling, Kürnach, both of Germany

[73] Assignee: Fichtel & Sachs AG, Schweinfurt, Germany

[21] Appl. No.: 515,348

[22] Filed: Aug. 15, 1995

[30] Foreign Application Priority Data

Aug. 17, 1994 [DE] Germany .................. 44 28 829.8

[51] Int. Cl.[6] .................................................. F16D 13/58
[52] U.S. Cl. .................... 192/70.17; 192/211; 74/574
[58] Field of Search ............ 192/70.17, 70.18, 192/211; 74/574

[56] References Cited

U.S. PATENT DOCUMENTS

| | | | |
|---|---|---|---|
| 4,846,323 | 7/1989 | Fukushima | 192/70.17 X |
| 4,856,636 | 8/1989 | Meinhard | 192/70.17 |
| 5,062,513 | 11/1991 | Grosspietsch et al. | |
| 5,293,978 | 3/1994 | Reik et al. | 192/70.17 |
| 5,301,780 | 4/1994 | Jackel | 74/574 X |
| 5,367,920 | 11/1994 | Bonfilio | 192/70.17 X |
| 5,415,261 | 5/1995 | Friedmann | 192/70.17 |
| 5,476,166 | 12/1995 | Schierling | 192/70.17 X |
| 5,575,183 | 11/1996 | Schierling et al. | 74/574 |

FOREIGN PATENT DOCUMENTS

| | | |
|---|---|---|
| 0617209 | 9/1994 | European Pat. Off. . |
| 3410953 | 5/1985 | Germany . |
| 3430457 | 2/1986 | Germany . |
| 3427163 | 4/1986 | Germany . |
| 3442548 | 5/1986 | Germany . |
| 3916853 | 5/1990 | Germany . |
| 4113287 | 10/1991 | Germany . |
| 4117580 | 12/1991 | Germany . |
| 4122333 | 1/1992 | Germany . |
| 4214628 | 12/1992 | Germany . |
| 4214655 | 12/1992 | Germany . |
| 2194021 | 2/1988 | United Kingdom . |
| 2243899 | 11/1991 | United Kingdom . |
| 2266125 | 10/1993 | United Kingdom ............ 192/70.17 |

*Primary Examiner*—Andrea L. Pitts
*Attorney, Agent, or Firm*—Nils H. Ljungman and Associates

[57] ABSTRACT

A flywheel apparatus including a first centrifugal mass connected to a drive mechanism and a second centrifugal mass connected to the first centrifugal mass by a torsional vibration damper, whereby the second centrifugal mass is rotatable with respect to the first centrifugal mass and located on the second centrifugal mass is a clutch housing. The clutch housing can have an application plate which is non-rotational but can move axially. The clutch housing can also have an application element which applies an application force, and a clutch plate which is located between the application plate and a counterpressure plate, whereby the clutch housing together with the counterpressure plate forms a pre-fabricated unit which can be fastened to the corresponding centrifugal mass by fastening elements.

20 Claims, 6 Drawing Sheets

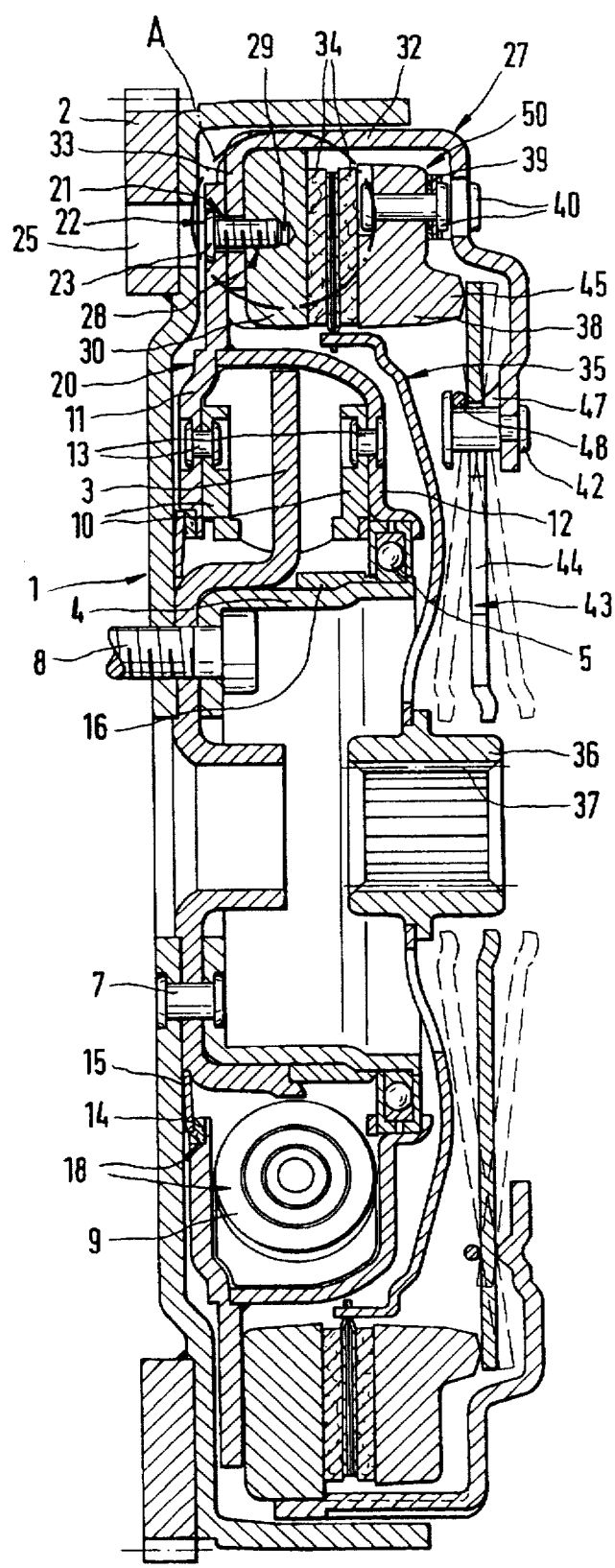

FRICTION CLUTCH FOR THE TRANSMISSION OF A MOTOR VEHICLE AND A FLYWHEEL ASSEMBLY FOR A FRICTION CLUTCH

BACKGROUND OF THE INVENTION

1. Field of the Invention

The present invention generally relates to a friction clutch for the transmission of a motor vehicle and a flywheel apparatus fop a friction clutch, which flywheel apparatus has a first centrifugal mass connected to a drive and a second centrifugal mass connected to the first centrifugal mass by a torsional vibration damper. The second centrifugal mass is rotatable with respect to the first centrifugal mass. A clutch housing is located on the second centrifugal mass. The clutch housing has an application plate, which application plate is non-rotational but can move axially. The clutch housing also includes an application device, which application device can apply an application force. The clutch housing also includes a clutch plate, which clutch plate is located between the application plate and a counterpressure plate.

2. Background Information

German Patent No. 41 13 287 A1, for example, discloses a known flywheel apparatus. This flywheel apparatus is fastened by connecting means in the form of screws to a plate, which is in turn connected by additional connecting means to a driving mechanism, for example to the crankshaft of an internal combustion engine. The purpose of the above-mentioned connecting means is to make it possible to pre-assemble the complete flywheel apparatus, and to connect the complete flywheel apparatus to the crankshaft by bolting it to the plate.

As a result of the preassembly of the flywheel apparatus, it is apparent that, when the friction linings, which friction linings are located on a clutch plate between an application plate and a counterpressure plate, become worn, it is easy to replace the flywheel apparatus by removing the above-mentioned connecting means. However, this advantage is offset by the disadvantage that the parts of the flywheel apparatus (e.g. a first centrifugal mass and a second centrifugal mass, which second centrifugal mass is connected to the first centrifugal mass by a torsional vibration damper) may not exhibit any noticeable wear, but yet are also involved in the replacement.

German Patent No. 39 16 853 A1, as illustrated in FIG. 10 of that patent, discloses a flywheel apparatus including a clutch housing, which clutch housing has an application device in the form of a membrane spring. The clutch housing also includes an application plate and a clutch plate, which clutch plate is non-rotationally located on a transmission shaft. The clutch housing is connected by connecting means, such as screws, to a counterpressure plate, which counterpressure plate connects the clutch housing with a centrifugal mass. This centrifugal mass is connected by a torsional vibration damper to an additional centrifugal mass, which additional centrifugal mass is bolted to a crankshaft of an engine.

By removing the connecting means, the clutch housing and the counterpressure plate can be removed from the remaining portion of the flywheel apparatus. The remaining portion of the flywheel apparatus remains bolted to the crankshaft. The result is that it is easier to replace those elements of the flywheel apparatus which are subject to wear in operation, although the problem remains that the individual elements must be disassembled one after another, which is a relatively time-consuming procedure. The installation of new parts is also a time-consuming operation, and requires a great deal of skill on the part of the person performing the assembly process.

OBJECT OF THE INVENTION

The object of the present invention is to design a flywheel apparatus so that its elements, subjected to wear during operation, can be replaced with new elements with essentially the least possible expenditure of time and effort in the assembly process.

SUMMARY OF THE INVENTION

The present invention teaches that this object can be achieved by designing the clutch housing and the counterpressure plate so as to form an essentially pre-fabricated unit, which pre-fabricated unit can be fastened to the corresponding centrifugal mass by fastening elements. By pre-assembling the clutch housing to the counterpressure plate, those elements of the flywheel apparatus which can be subjected to wear during operation can be combined into one unit. This unit can then be fastened by fastening elements to the corresponding centrifugal mass and thus to an element of the flywheel apparatus, which element is essentially not exposed to any significant wear. Therefore, when the friction linings become worn, the preassembled unit can be separated from the centrifugal mass by essentially releasing the fastening elements, and such an operation can require essentially little effort.

The second centrifugal mass can preferably be connected to the first centrifugal mass by a torsional vibration damper. The first centrifugal mass and the second centrifugal mass essentially need not be involved in the replacement process. As a result of the reduction in the number of elements of the flywheel apparatus which should be replaced to the actual wear parts themselves, the cost of materials for the replacement can be kept essentially as low as possible. Moreover, since essentially only the fastening elements need to be removed for the replacement procedure, the time and the costs involved in making such a replacement can be very low.

In accordance with an embodiment of the present invention, the clutch housing can extend into the vicinity of the counterpressure plate. Such an extension of the clutch housing can be important for the connection between the clutch housing and the counterpressure plate.

In accordance with an additional embodiment of the present invention, the ring-shaped wall of the clutch housing can be bent so that the counterpressure plate can be held in both the axial direction and the radial direction by the clutch housing. If the counterpressure plate is not supported from behind by the ring-shaped wall of the clutch housing, it is also essentially possible to use connecting elements, which can permit a solid connection between the clutch housing and the counterpressure plate.

To remove the pre-assembled unit with the elements which can be subject to wear, and to reinstall this unit, it is desirable to have facilitated accessibility to the fastening elements from the outside of the flywheel apparatus. Accordingly, this facilitated access can preferably be realized by providing openings in the first centrifugal mass. The openings can preferably be aligned with recesses for the fastening elements in the second centrifugal mass. This essentially permits the penetration of assembly tools, so that a fastening element in the form of a screw can be easily removed, or a fastening element in the form of a rivet can be drilled out. The installation and fastening of a new pre-assembled unit can be done in a similar manner, by tightening the screws or by reinstalling rivets on the corresponding centrifugal mass.

In accordance with another embodiment of the present invention, there can be a refinement of the invention wherein the clutch housing can be divided in the axial direction, so that after the removal of retaining devices, which retaining devices can hold the two parts of the clutch housing in contact with one another, the part of the clutch housing farther from the centrifugal masses can be removed, thereby providing access to the clutch plate. Such an embodiment can be advantageous if, for example, the individual parts of the pre-assembled unit, e.g. the clutch plate, are to be replaced instead of the entire unit.

As a result of depressions, which depressions can be designed over at least a portion of their depth so that the depressions can have a diameter which can increase with increasing depth, it is possible to use particularly simple rivets. Such rivets do not essentially require any auxiliary measures for the radial widening of their shank. A simple upsetting, clenching, or closing of the rivet can cause the rivet shank, essentially as soon as its free end is in contact with the corresponding side of the depression, to expand in the radial direction. Thus, the rivet can come into contact with the conical outside wall of the opening. When deformed in this manner, the rivet can essentially no longer move backward into its starting position. The rivet can be removed essentially only by drilling it out.

Such depressions can also be located in the application plate to attach the application plate to the clutch housing.

It can be very advantageous, during installation, to use rivets to connect the pre-assembled unit with the centrifugal masses during the fabrication of a new flywheel apparatus after the replacement or removal of the unit. It may, however, be essentially easier for an installer to fasten the new, pre-assembled unit to the corresponding centrifugal mass with the use of screws. This fastening can be realized by aligning the pre-assembled unit in such a manner that as soon as the installer has oriented the pre-assembled unit with respect to the corresponding centrifugal mass, the threaded borings can be aligned with the recesses.

When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

One aspect of the present invention resides broadly in a friction clutch, such as for a transmission for a motor vehicle, the friction clutch comprising: a clutch housing; a clutch disc disposed within the clutch housing, the clutch disc defining an axis of rotation and an axial direction parallel to the axis of rotation; a pressure plate disposed within the clutch housing and movable in the axial direction, the pressure plate for applying an axial force to the clutch disc along the axial direction; a device for biasing the pressure plate in the axial direction to apply an axial force to the clutch disc; a rotational member; the rotational member being disposed adjacent the clutch disc axially opposite the pressure plate; a centrifugal mass; the centrifugal mass being disposed substantially adjacent the rotational member; the clutch disc being disposed between the pressure plate and the rotational member; the clutch disc comprising friction linings being disposed substantially between the pressure plate and the rotational member; at least a portion of the clutch housing being disposed adjacent and in contact with the rotational member; an element for connecting the portion of the clutch housing and the rotational member; the connection, the portion of the clutch housing and the rotational member comprising a pre-fabricated unit; the pre-fabricated unit comprising an apparatus for fastening the pre-fabricated unit to the centrifugal mass; and the pre-fabricated unit being fastened to the centrifugal mass by the apparatus for fastening the pre-fabricated unit.

Another aspect of the present invention resides broadly in a friction clutch for a transmission of a motor vehicle, the friction clutch comprising: a clutch housing comprising a first portion; a clutch disc disposed within the clutch housing, the clutch disc defining an axis of rotation and an axial direction parallel to the axis of rotation; a pressure plate disposed within the clutch housing and movable in the axial direction, the pressure plate for applying an axial force to the clutch disc along the axial direction; an apparatus for biasing the pressure plate in the axial direction; the clutch disc being disposed adjacent the pressure plate; the clutch disc comprising friction linings being disposed substantially adjacent the pressure plate; the friction clutch further comprising a centrifugal mass; the centrifugal mass being disposed adjacent the clutch disc axially opposite the pressure plate; a mass-produced, pre-fabricated unit comprising: a second portion of the clutch housing; a rotational member; the second portion of the clutch housing being disposed adjacent and in contact with the rotational member; an apparatus for connecting the second portion of the clutch housing and the rotational member together; the connecting apparatus providing a connection between the second portion of the clutch housing and the rotational member; an apparatus for fastening the pre-fabricated unit to the centrifugal mass; the pre-fabricated unit being fastened to the centrifugal mass by the apparatus for fastening the pre-fabricated unit; the rotational member being disposed adjacent the clutch disc axially opposite the pressure plate; the friction linings being disposed substantially between the pressure plate and the rotational member; the centrifugal mass being disposed substantially adjacent the rotational member; and the rotational member being disposed between and in contact with the centrifugal mass and the clutch housing.

Yet another aspect of the present invention resides broadly in a method of making and operating a friction clutch for a motor vehicle, the friction clutch comprising: a clutch housing comprising a first portion; a clutch disc disposed within the clutch housing, the clutch disc defining an axis of rotation and an axial direction parallel to the axis of rotation; a pressure plate disposed within the clutch housing and movable in the axial direction, a pressure plate for applying an axial force to the clutch disc along the axial direction; a biasing apparatus for biasing the pressure plate in the axial direction; the clutch disc being disposed adjacent the pressure plate; the clutch disc comprising friction linings being disposed substantially adjacent the pressure plate; the friction clutch further comprising a centrifugal mass; said centrifugal mass being disposed adjacent the clutch disc axially opposite the pressure plate; the friction clutch further comprising a pre-fabricated unit; the pre-fabricated unit comprising: a second portion of the clutch housing; a rotational member; the second portion of the clutch housing being disposed adjacent and in contact with the rotational member; an apparatus for connecting the second portion of the clutch housing and the rotational member together; the connecting means providing a connection between the second portion of the clutch housing and the rotational member; an apparatus for fastening the pre-fabricated unit to the centrifugal mass; the pre-fabricated unit being fastened to the centrifugal mass by the apparatus for fastening the pre-fabricated unit; the rotational member being disposed adjacent the clutch disc axially opposite the pressure plate; the friction linings being disposed substantially between the pressure plate and the rotational member; the centrifugal mass being disposed substantially adjacent the rotational member, the method comprising the steps of: providing a clutch housing, the clutch housing comprising a first portion; providing a clutch disc, the clutch disc having an axis of rotation and an axial direction parallel to the axis of rotation; providing a pressure plate; providing an apparatus for biasing the pressure plate in the axial direction; providing friction linings; providing a centrifugal mass; providing a pre-fabricated unit; the step of providing the pre-fabricated unit further comprising: providing a second portion of the clutch housing; providing a rotational member; providing an apparatus for connecting the second portion of the clutch housing and the rotational member together; providing an apparatus for fastening the pre-fabricated unit to the centrifugal mass; the method further comprising the steps of: disposing the clutch disc within the clutch housing; disposing the pressure plate within the clutch housing; configuring the pressure plate to be movable in the axial direction; configuring the pressure plate for applying an axial force to the clutch disc along the axial direction; configuring the apparatus for biasing the pressure plate in the axial direction; disposing the clutch disc adjacent the pressure plate; configuring the clutch disc to comprise the friction linings; disposing the friction linings substantially adjacent the pressure plate; disposing the centrifugal mass adjacent the clutch disc axially opposite said pressure plate; configuring the pre-fabricated unit to comprise the second portion of the clutch housing; configuring the pre-fabricated unit to further comprise the rotational member; disposing the rotational member adjacent clutch disc axially opposite the pressure plate; disposing the second portion of said clutch housing adjacent and in contact with the rotational member; disposing the friction linings substantially between the pressure plate and the rotational member; connecting the second portion of the clutch housing and the rotational member by the apparatus for connecting the second portion of the clutch housing and the rotational member together; disposing the pre-fabricated unit adjacent the centrifugal mass; fastening the pre-fabricated unit to the centrifugal mass by the apparatus for fastening the pre-fabricated unit to the centrifugal mass; biasing the pressure plate toward the rotational member with the biasing apparatus; engaging the clutch disc with the rotational member, by the pressure plate, to make contact between the friction linings, the rotational member and the pressure plate; and disengaging the clutch disc with the rotational member, by releasing the pressure plate, and discontinuing contact between the friction lining, the rotational member and the pressure plate.

BRIEF DESCRIPTION OF THE DRAWINGS

The present invention is explained in greater detail below with reference to the embodiments illustrated in the accompanying drawings, in which:

FIG. 1 shows a longitudinal section through a flywheel apparatus with a clutch housing which radially encloses and supports a counterpressure plate from behind to form a pre-assembled unit;

DESCRIPTION OF THE PREFERRED EMBODIMENT

Figure 1A:
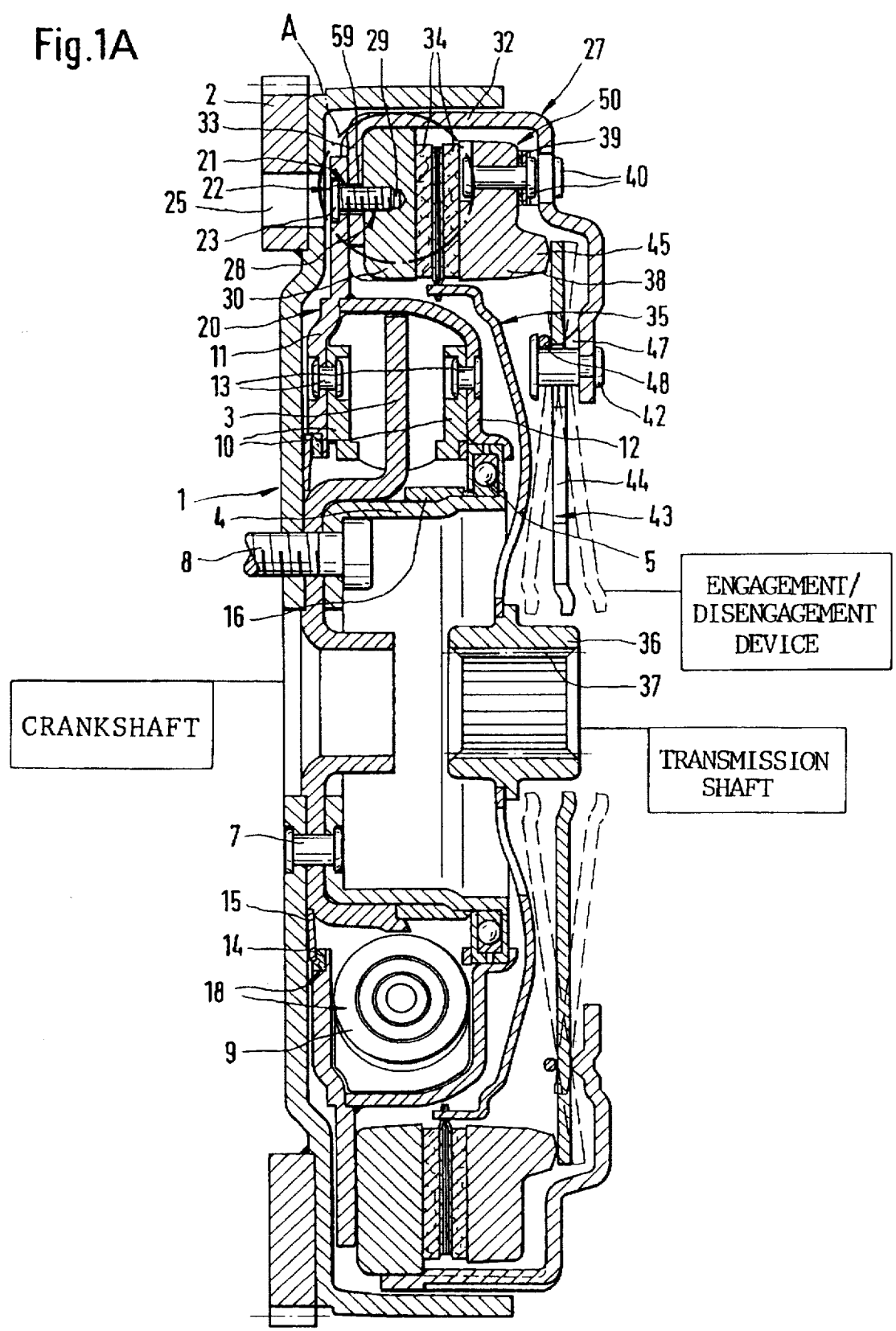
FIG. 1A shows the same view as shown in FIG. 1 but with added components.

The flywheel apparatus illustrated in FIG. 1 includes a first centrifugal mass 1. In the radially outer area, the first centrifugal mass 1 can support a starter rim 2. The radially inner area of the centrifugal mass 1 can be provided with passages which can preferably be aligned with similar passages in a hub disc 3 and a sleeve 4. The free end of sleeve 4 can preferably support a bearing element 5. The centrifugal mass 1, the hub disc 3 and the sleeve 4 can be firmly connected to one another by rivets 7 which can penetrate some of the passages, and also by screws 8 which can penetrate some of the passages. The centrifugal mass 1, the hub disc 3 and the sleeve 4 can be connected to a driving mechanism (as shown in FIG. 1A), e.g. the crankshaft of an internal combustion engine.

In accordance with an embodiment of the present invention, for the purpose of fastening the rivets 7 and the screws 8, there are preferably openings in the clutch plate 35. The openings in the clutch plate 35 can preferably be located axially adjacent the area where the rivet 7 or the screw 8 can essentially be inserted to fasten the first centrifugal mass 1, the hub disc 3 and the sleeve 4 together. By inserting a tool through the opening in the clutch plate 35, the head of the rivet 7 or of the screw 8 can then be tightened.

The hub disc 3 can preferably be engaged in the radially outer area with spring elements 9, to which spring elements 9 pressure can also be applied by projections 10. The projections 10 can preferably be fastened to cover plates 11 and 12 by rivets 13. The cover plates 11, 12 can preferably be firmly connected to one another radially outside the hub disc 3 by welding. On its radially inner end, the cover plate 11 is preferably engaged with a basic friction device 14, which friction device 14 can interact in the manner which is well-known in the art with regard to an application spring 15. And the cover plate 12, on its radially inner end, in interaction with the corresponding projection 10, can axially secure the bearing element 5, the inner bearing ring of which bearing element 5 is in turn supported on the hub disc 3 by a bushing 16. The spring elements 9, like the basic friction device 14, can preferably be part of a torsional vibration damper 18. The torsional vibration damper 18 is preferably enclosed by the cover plates 11 and 12 and can preferably be filled with viscous medium to damp movements of the spring elements 9.

Figure 3:
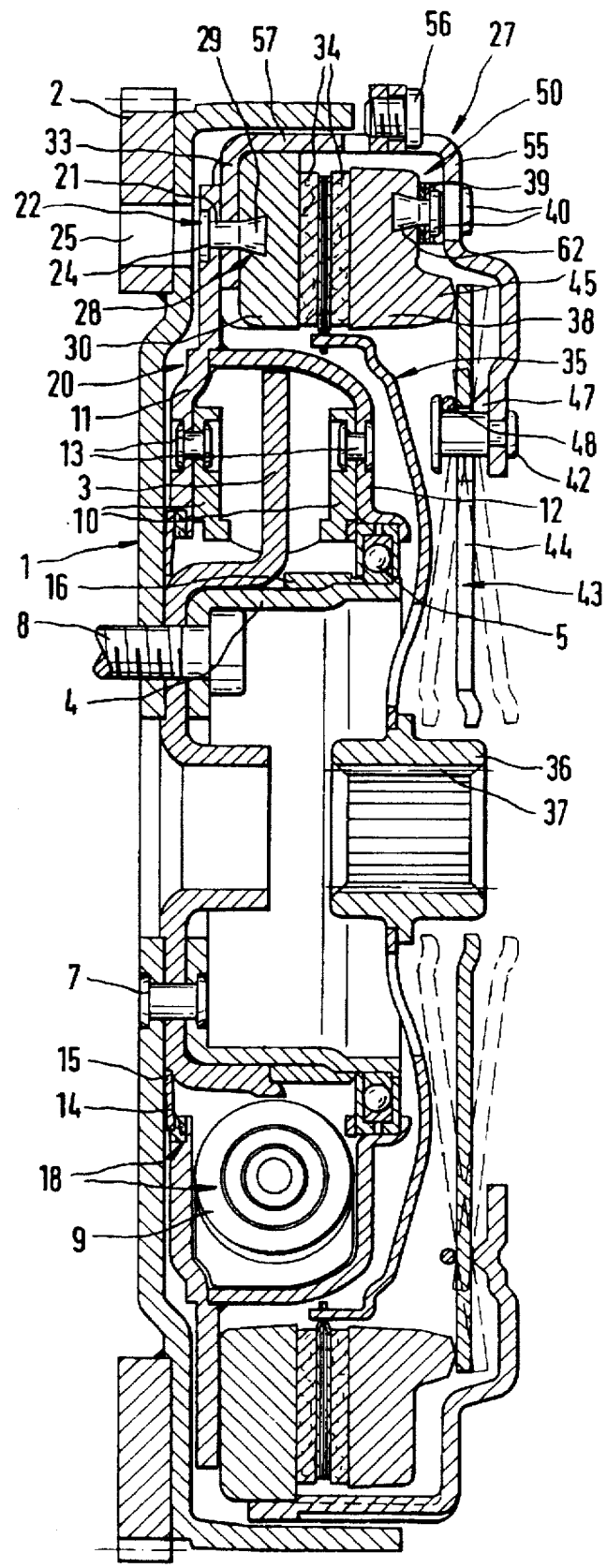
FIG. 3 is similar to FIG. 1, but with a clutch housing which is divided in the axial direction.

The cover plates 11 and 12 preferably move relative to the hub disc 3. The cover plates 11, 12 are preferably active as the second centrifugal mass 20 of the flywheel apparatus. The cover plate 11 preferably projects in the radial direction beyond the point where the cover plate 11 is welded to the cover plate 12 radially outward. Close inside the outer end of the cover plate 11, there can preferably be a recess 21, which recess 21 essentially permits the insertion of a fastening means 22, e.g. a screw 23 or, as illustrated in FIG. 3, a rivet 24. Aligned with the recess 21, there can preferably be openings 25 in the first centrifugal mass 1. Also preferably aligned with the recess 21, there can be a passage 59 (as shown in FIG. 1A) in a clutch housing 27 and a depression 28, e.g. in the form of a blind hole 29, that can be located in a counterpressure plate 30.

If a screw 23 is to be inserted as the fastening element 22, as illustrated in FIG. 1, the depression 28 can preferably be cylindrical and can be provided with a thread. On the other hand, when a rivet 24 is used as the fastening element 22, as illustrated in FIG. 3, it is advantageous to design the depression 28 so that it is conical, whereby its diameter can essentially increase as the penetration depth of the rivet 24 increases. It is thereby possible to use a very simple rivet without an integrated toggle or spreading fastener, since a simple upsetting of the rivet can cause an expansion of the rivet in its shank area until the shank of the rivet comes into contact with the conical outside wall in the counterpressure plate 30. A backward movement of the rivet 24, after the upsetting, can therefore be essentially prevented.

Therefore, in accordance with a preferred embodiment of the present invention, the cover plates 11, 12 can be designed to move with respect to the hub disc 3. In addition, the cover plates 11, 12 can be designed to essentially act as the second centrifugal mass 20. For the purpose of operatively connecting the cover plates 11, 12 to the the counterpressure plate 30, the cover plate can preferably extend radially outward beyond the point where the cover plate 11 is welded to cover plate 12. For the purpose of fastening the cover plate 11 to the counterpressure plate 30, the recesses 21 in the radially extended portion of the cover plate 11 can preferably be aligned with passages 59 (as shown in FIG. 1A) in the clutch housing 27 and with the depressions 28 of the counterpressure plate 30. The recesses 21 can also preferably be aligned with the openings 25 of the first centrifugal mass 1. When the recesses 21, depressions 28, and the openings 25 are essentially in alignment with one another, the fastening elements 22 can then be inserted therethrough thereby fastening the cover plate 11 with respect to the counterpressure plate 30.

The clutch housing 27 preferably has a ring-shaped wall 32, which ring-shaped wall 32 preferably surrounds the counterpressure plate 30. On the side facing the centrifugal masses 1 and 20, the wall 32 can preferably have an extension 33, which extension 33 can preferably be bent radially inward. The above-mentioned passage 59 for the respective fastening element 22 is preferably provided in the extension 33.

The counterpressure plate 30 can be placed in contact with a friction lining 34 of a clutch plate 35, which clutch plate 35 is preferably located non-rotationally on a hub 36. The hub 36 is preferably designed so that it has gear teeth 37 along its inside diameter. As a result of gear teeth 37, the clutch disc 35 can be non-rotationally connected to a transmission shaft (as shown in FIG. 1A). On its side facing away from the counterpressure plate 30, the clutch plate 35 can be placed in contact with an application plate 38 by an additional friction lining 34. This application plate 38, however, is preferably connected non-rotationally to the clutch housing 27 by an elastic element 39, e.g. transverse leaf springs, but so that it can still move axially. The connection of the elastic element 39 to the application plate 38, on one end,
and to the clutch housing 27, on the other end, can each be made by a rivet 40. The portion of the rivet 40 which is positioned in the application plate 38 can be engaged in a recess 62, which recess 62 can preferably be conical, as illustrated in FIG. 3.

In accordance with an embodiment of the present invention, the application plate 38 can preferably be non-rotationally connected to the clutch housing 27. The elastic elements 39 can preferably be fastened between the clutch housing 27 and the application plate 38 by rivets 40. The elastic elements 39 can thereby essentially permit the application plate 38 to move in an axial direction with respect to the clutch housing 27. A portion of the clutch housing 27 can preferably be connected to a portion of the application element 43, the free end of which application element 43 can preferably be located adjacent the application plate 38. The application element 43 can thereby apply a force to the application plate 38. Since the elastic elements 39 essentially permit an axial movement of the application plate 38 with respect to the clutch housing 27, the application plate 38 will also essentially move axially with respect to friction lining 34. The elastic elements 39 can permit the application plate 38 to move axially toward and in contact with friction lining 34. Similarly, the elastic elements 39 can permit the application plate 38 to move in an axial direction away from friction lining 34.

Radially farther inside on the clutch housing 27, there can preferably be bearing necks 42 for supporting an application element 43, such as a membrane spring 44. The application element 43 can be brought into contact in the radially outer area with a lug 45 of the application plate 38. The radially inner area of the application element 43 can be in contact with a release lever or clutch disengagement device (as shown in FIG. 1A). On one hand, the application element 43 can be held in position by tips 47 preferably formed on the clutch housing 27. On the other hand, the application element can be held in position by a bearing ring 48. Together with the counterpressure plate 30, a pre-assembled unit 50 can be formed by the clutch housing 27, which clutch housing 27 can preferably have the application element 43, the application plate 38 and the clutch plate 35.

Therefore, in accordance with an embodiment of the present invention, the pre-assembled unit 50 can preferably include the counterpressure plate 30 and the clutch housing 27, which clutch housing 27 can include the application element 43, the application plate 38, and the clutch plate 35.

Figure 4:
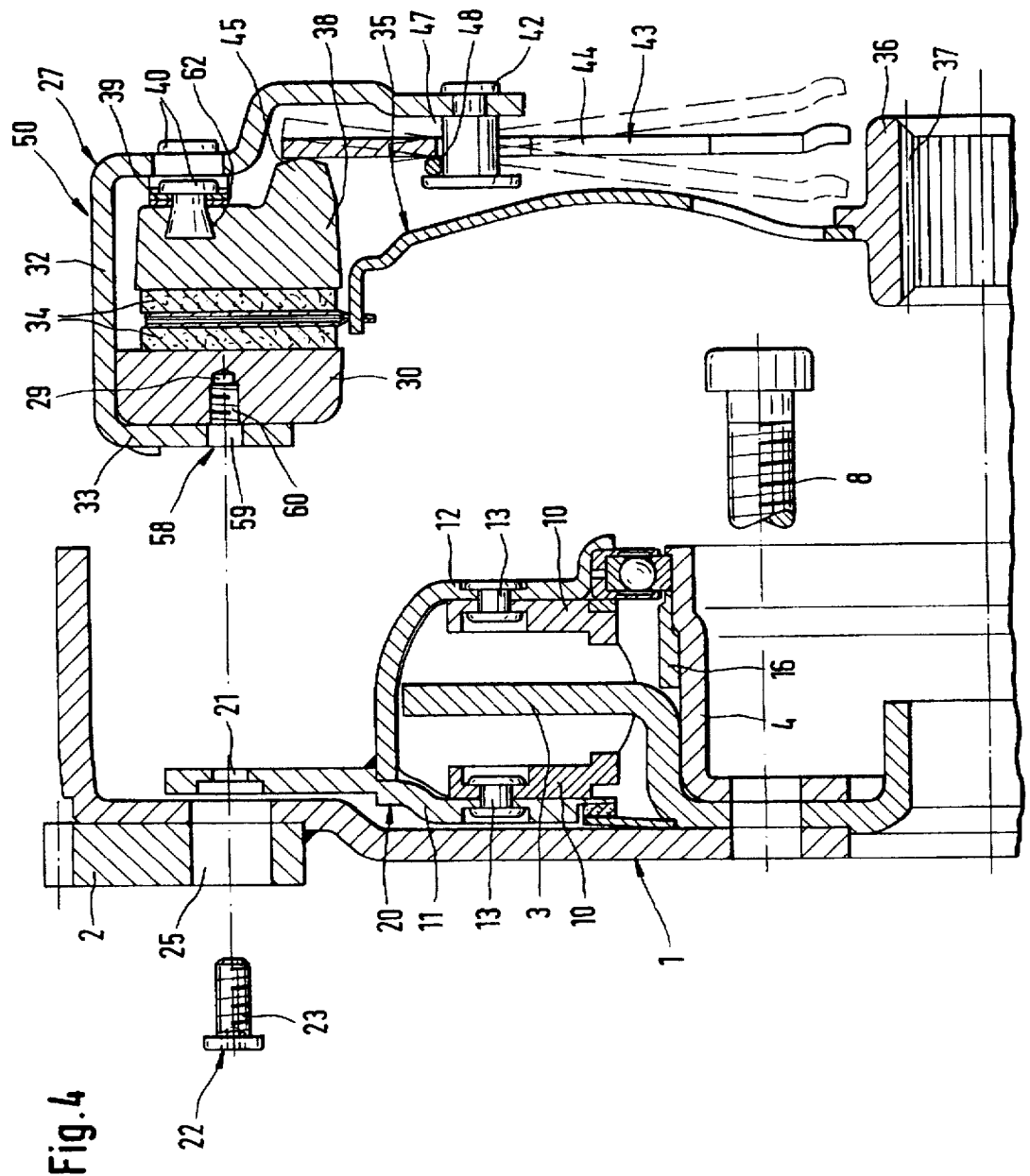
FIG. 4 shows the flywheel apparatus on the removed, pre-assembled unit.

After the flywheel apparatus has been in operation for an extended period of time, the thickness of the friction linings 34 on the clutch plate 35 may be significantly reduced by wear. In addition, both the application plate 38 and the counterpressure plate 30 can each have traces of wear on their sides facing the friction lining 34. When the above-mentioned elements 30, 35 and 38 should be replaced due to wear, the pre-assembled unit 50 is preferably removed from the second centrifugal mass 20. The pre-assembled unit 50 can essentially be removed from the second centrifugal mass 20 by removing the fastening elements 22 from the flywheel apparatus. If screws 23 are used as the fastening elements 22, the pre-assembled unit 50 can be removed by loosening the screws 23. If rivets 24 are used as the fastening elements 22, the pre-assembled unit 50 can be removed by drilling out the rivets 24. Then, the clutch housing 27, as shown in FIG. 4, can be removed, without having to remove the centrifugal masses 1 and 20 and the torsional vibration damper 18 along with the clutch housing 27. Since the application element 43 is preferably held by the bearing neck 42, and the application plate 38 is preferably held by the elastic element 39 on the clutch housing 27, and the counterpressure plate 30 can be held by the clutch housing 27 both in the radial and in the axial direction, these elements, like the clutch plate 35 clamped between them, will be essentially carried along when the clutch housing 27 is removed.

Therefore, in accordance with an embodiment of the present invention, since the clutch housing 27 can preferably be connected with the application element 43, the application plate 38, the counterpressure plate 30, and the friction linings 34, all these elements can essentially be removed together when the components need to be replaced due to wear. It is a particularly advantageous feature of the present invention that the clutch housing 27 can be removed for replacement without having to remove or replace the centrifugal masses 1, 20.

Essentially just as easily, another clutch housing 27 equipped with new wear elements can be inserted. The new clutch housing 27 can be re-attached to the corresponding centrifugal mass 20 essentially simply by inserting the fastening elements 22. When screws 23 are used as the fastening elements 22, the screws 23 are preferably tightened into the corresponding threaded depression 28, while when rivets 24 are used, the rivets 24 are preferably placed by upsetting the shanks of the rivets 24 in contact with the conical outside diameter of the depressions 28. The tools for fastening the respective fastening elements 22, just as for the removal operation, can preferably be inserted through the openings 25 in the first centrifugal mass 1.

Figure 2:
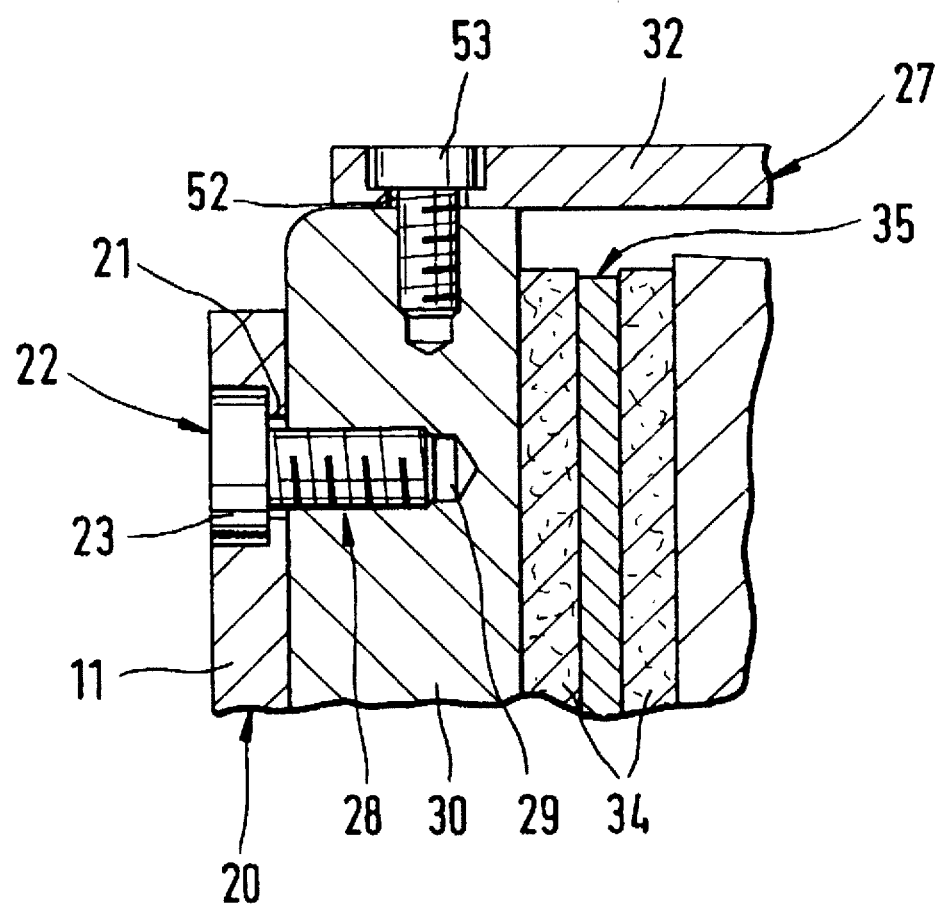
FIG. 2 shows a detail A on a larger scale of the embodiment illustrated in FIG. 1, in which the clutch housing is fastened to the counterpressure plate by means of radially-oriented connecting elements.

FIG. 2 shows a clutch housing 27, on which clutch housing 27 the ring-shaped wall 32 does not make the transition into an extension 33, as shown in FIG. 1, which extension 33 can run radially inward. Instead, the wall 32 is preferably provided with apertures 52, which apertures 52 can be penetrated by connecting elements 53 such as screws or rivets, whereby the connecting elements 53 can be fastened in the counterpressure plate 30. The connecting elements 53 can preferably extend in the radial direction.

Therefore, as shown in FIG. 2, in accordance with an embodiment of the present invention, the ring-shaped wall 32 of the clutch housing 27 can preferably be connected with the counterpressure plate 30 by connecting elements 53. The connecting elements 53 can preferably be inserted into the apertures 52 of the ring-shaped wall 32, which connecting elements 53 can preferably extend in the radial direction.

FIG. 3 shows a two-part embodiment of the clutch housing 27, whereby the right-hand part 55, with respect to FIG. 3, is preferably connected to the other part 57 by retaining elements 56, e.g. screws. As a result of the division of the clutch housing 27 into two parts, it is possible to remove the part 55 after removal of the retaining elements 56. Thereby, at the same time, the application element 43 and the application plate 38 held by elastic element 39 can be removed. Then the clutch plate 35 can be extracted. After the insertion of a new clutch plate 35, the part 55 of the clutch housing 27 is preferably replaced and connected to the part 57 by tightening the retaining elements 56. This procedure can preferably be followed when the friction linings 34 on the clutch plate 35 are severely worn, but there may still be hardly any signs of wear on the corresponding sides of the application plate 38 and the counterpressure plate 30. The greater effort required to replace the clutch disc 35, with respect to the embodiment described above, can be compensated for, to some extent, by the smaller number of parts requiring replacement, since essentially only a new clutch plate 35 is used.

In accordance with an embodiment of the present invention, the clutch housing 27 can preferably be designed to include the two parts 55, 57. Such an embodiment can essentially reduce the number of components to be replaced. If, for example, essentially only the friction linings 34 are worn and require replacement, the two parts 55, 57 of the clutch housing 27 can preferably be disconnected from one another by removing the retaining elements 56. The clutch plate 35 can thereby be removed and replaced by a new clutch plate with new friction linings.

When a flywheel apparatus is newly manufactured, the fastening elements 22 which can be used to fasten the pre-assembled unit 50 to the second centrifugal mass 2 can be the rivets 24, as illustrated in FIG. 3. When wear on the elements of the pre-assembled unit 50 makes it necessary to replace the pre-assembled unit 50, the rivets 24 can be drilled out, whereby, in the manner described above, the tools can preferably be introduced by the openings 25 in the first centrifugal mass 1. As illustrated in FIG. 4, the pre-assembled unit 50 can then be extracted.

In accordance with an embodiment of the present invention, by designing the flywheel apparatus to include the pre-assembled unit 50, the present invention permits the unit 50 to be assembled in the factory thereby essentially ensuring that the pre-assembled unit 50 can be manufactured according to quality standards. Conversely, a flywheel apparatus of the known art may have included a number of separate elements to be assembled by service station workers, for example, who may have less assembly skills than factory workers. The concept of mass production in a factory, for example, in essence, can possibly refer to the production of at least hundreds of units per day, and can possibly range up to the production of thousands of units per day. As such, a large number of pre-assembled units can be mass produced and the components of the pre-assembled units can be assembled in alignment with one another.

For a particularly simple assembly of a new, pre-assembled unit 50, which pre-assembled unit 50 can then be installed in the flywheel apparatus, on the radius of the recesses 21, at an angle between each two depressions 28 (as shown in FIG. 1), there can preferably be locators 58, as shown in FIG. 4, for fastening elements 22 in the form of screws 23. These locators 58 can preferably have a passage 59 in the extension 33 of the clutch housing 27 and, aligned with the passage, a threaded boring 60 in the counterpressure plate 30 for the respective screw 23. Accordingly, for assembly, after being inserted into the flywheel apparatus, the pre-assembled unit 50 will preferably be rotated until the locators 58 are essentially aligned with the recesses 21 in the second centrifugal mass 20. By tightening the screws 23, the pre-assembled unit 50 can then be attached essentially very easily to the flywheel apparatus.

Summarizing, in accordance with an embodiment of the present invention, for the purpose of installing the pre-assembled unit 50 in the flywheel apparatus, locators 58 can preferably be designed adjacent the passages 59 of extension 33. As shown in FIG. 4, there can be recesses 21 located in the second centrifugal mass 20. The installation of the pre-assembled unit 50 can be essentially simplified by designing the flywheel apparatus such that the counterpressure plate 30 can preferably have threaded borings 60 (as shown in FIG. 4). The threaded borings of the counterpressure plate 30 can preferably be circumferentially spaced between each of the depressions 28 of the counterpressure plate 30 (as shown in FIG. 3). To replace worn friction linings 34, for example, a new clutch plate 35 can be attached between the counterpressure plate 30 and the application plate 38. The counterpressure plate 30 can then essentially be fastened to the second centrifugal mass 20 by fastening elements 22, preferably in the form of screws 23, which screws 23 can be inserted and firmly fastened into the threaded borings 60. For this purpose, the locators 58 can be aligned with the radius of recesses 21. The screw 23 can be inserted through the opening 25 of the first centrifugal mass 1, then through recess 21, thereby into passage 59 of extension 33. The screw 23 can then be tightened into the threaded boring 60 of the blind hole 29 of the counterpressure plate 30 thereby attaching the pre-assembled unit 50 to the flywheel apparatus.

In accordance with an embodiment of the present invention, the design of the pre-assembled unit 50 can include components that can be essentially matched, which matching can thereby permit precise engagement of the components. Such precise engagement of the related components can essentially prevent chatter and can provide an increased friction without more pedal effort.

Figure 5:
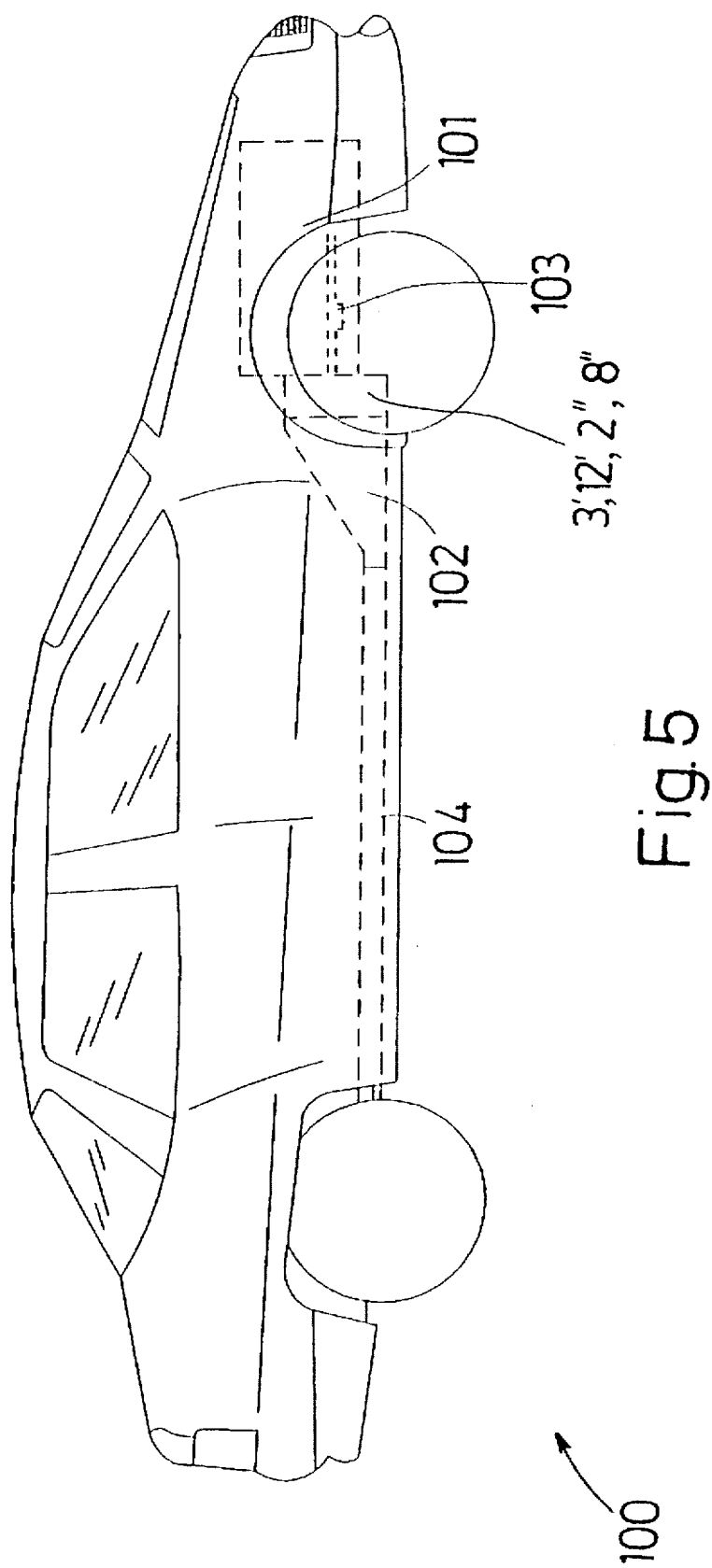
FIG. 5 depicts the general components of a motor vehicle power train.

FIG. 5 shows what could be considered to be a typical automobile 100, which automobile 100 can include an internal combustion engine 101, which can be mounted in a forward portion of the automobile 100. The combustion engine 101 can have a crankshaft 103 for outputting mechanical rotary power generated by the engine 101. The automobile 100 could also typically include a transmission 102 for transmitting mechanical power from the crankshaft 103 of the engine 101 to the wheels, via drive shaft 104. If the automobile has a manual transmission 102, the flywheels 3', 12', pressure plate 2", and clutch disc 8" as described above may also be included for engaging the transmission 102 with the engine 101.

One feature of the invention resides broadly in the flywheel apparatus, consisting of a first centrifugal mass connected to a drive and a second centrifugal mass connected to the first centrifugal mass by means of a torsional vibration damper, whereby the second centrifugal mass is rotatable with respect to the first centrifugal mass and located on the second centrifugal mass is a clutch housing which has an application plate which is non-rotational but can move axially, application means which apply an application force, and a clutch plate which is located between the application plate and a counterpressure plate, characterized by the fact that the clutch housing 27 together with the counterpressure plate 30 forms a pre-fabricated unit 50 which can be fastened to the corresponding centrifugal mass 20 by means of fastening elements 22.

Another feature of the invention resides broadly in the flywheel apparatus characterized by the fact that the clutch housing 27 at least partly encloses the counterpressure plate 30 in the axial direction by means of a ring-shaped wall 32.

Yet another feature of the invention resides broadly in the flywheel apparatus characterized by the fact that the ring-shaped wall 32 of the clutch housing 27, on its end enclosing the counterpressure plate 30, has at least one extension 33 on its side farther from the clutch plate 35 which grips the counterpressure plate 30 from behind.

Still another feature of the invention resides broadly in the flywheel apparatus characterized by the fact that the clutch housing 27 can be fastened to the counterpressure plate 30 by means of connecting elements 53 which penetrate corresponding recesses 52 in the ring-shaped wall 32 of the clutch housing 27.

A further feature of the invention resides broadly in the flywheel apparatus characterized by the fact that the second centrifugal mass 20 has recesses 21 for the fastening elements 22 used to attach the preassembled unit 50, which recesses 21 are aligned with openings 25 in the first centrifugal mass 1.

Another feature of the invention resides broadly in the flywheel apparatus characterized by the fact that the clutch housing 27 is divided in the axial direction, preferably in the vicinity of the ring-shaped wall 32, whereby the part 55 farther from the centrifugal masses 1, 20 can be fastened to the other part 57 by retaining means 56.

Yet another feature of the invention resides broadly in the flywheel apparatus characterized by the fact that the fastening elements 22 are designed as rivets 24 which are each engaged with their free ends in corresponding depressions 28 in the preassembled unit 50, whereby the depressions 28 are designed over at least a portion of their depth so that they have a diameter which increases with increasing depth.

Still another feature of the invention resides broadly in the flywheel apparatus characterized by the fact that the application plate 38 is fastened to the connection to the elastic means 39 which form the connection to the clutch housing 27 by means of rivets 40 which are each engaged with their free ends in corresponding depressions 62, whereby the depressions 62 are designed over at least a portion of their depth so that they have a diameter which increases with increasing depth.

A further feature of the invention resides broadly in the flywheel apparatus characterized by the fact that on the radius on which the depressions 28 of the preassembled unit 50 are formed with respect to the center axis, at an angle between each two depressions 28, there is a threaded boring 60, into which screws 23 can be inserted as fastening elements 22 to fasten the preassembled unit 50 to the corresponding centrifugal mass (20), after the threaded borings 60 have been aligned with the recesses 21 in the centrifugal mass 20.

The components disclosed in the various publications, disclosed or incorporated by reference herein, may be used in the embodiments of the present invention, as well as, equivalents thereof.

Some examples of clutch assemblies and various components associated therewith which could possibly utilize the present invention may be disclosed in the following U.S. patents: U.S. Pat. No. 4,684,007 to Maucher, entitled "Clutch Plate"; U.S. Pat. No. 4,635,780 to Wiggen, entitled "Clutch Disc for a Motor Vehicle Friction Clutch"; U.S. Pat. No. 4,651,857 to Schraut et al., entitled "Clutch Disc Unit for a Motor Vehicle Friction Clutch"; U.S. Pat. No. 5,103,688 to Kuhne, entitled "Two-mass Flywheel"; and U.S. Pat. No. 4,777,843 to Bopp, entitled "Two-mass Flywheel Assembly With Viscous Damping Assembly".

Some examples of transmissions in which the present invention may be incorporated may be disclosed by the following U.S. patents: U.S. Pat. No. 5,199,316 to Hoffman, entitled "Fully-Synchronized Multiple Speed Manual Transmission for Motor Vehicles"; U.S. Pat. No. 4,458,551 to Winter, entitled "Manual Transmission"; and U.S. Pat. No. 3,858,460 to Porter et al., entitled "Four Speed Manual Transmission and Control".

Some examples of two-mass flywheels and the components thereof which may incorporate the present invention therein may be disclosed by the following U.S. patents: U.S. Pat. No. 5,103,688 to Kuhne, entitled "Two-Mass Flywheel"; U.S. Pat. No. 4,777,843 to Bopp, entitled "Two-Mass Flywheel Assembly With Viscous Damping Assembly".

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 28 829.8, filed on Aug. 17, 1994, having inventors Joachim Lindner and Bernhard Schierling, and DE-OS P 44 28 829.8 and DE-PS P 44 28 829.8 are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A friction clutch for a transmission of a motor vehicle, said friction clutch comprising:

a first centrifugal mass to be connected to a motor vehicle drive;

a second centrifugal mass;

said second centrifugal mass being rotatable with respect to said first centrifugal mass;

a clutch housing;

said clutch housing being disposed on said second centrifugal mass;

a clutch disc disposed within said housing, said clutch disc defining an axis of rotation and an axial direction parallel to the axis of rotation;

said clutch disc having first and second sides;

a pressure plate;

said pressure plate being disposed within said clutch housing and being movable in the axial direction to apply an axial force to said clutch disc;

a biasing structure to bias said pressure plate with respect to said clutch disc;

said pressure plate being disposed adjacent said first side of said clutch disc;

a counter pressure plate;

said counter pressure plate having a first side and a second side and an outer periphery connecting said first and second sides;

said first side of said counter pressure plate being disposed adjacent said second side of said clutch disc;

said second side of said counter pressure plate being disposed opposite said clutch disc and said first side of said counter pressure plate;

said clutch housing comprising first and second portions;

said first portion of said clutch housing being disposed adjacent said pressure plate and a distance from said counter pressure plate;

said second portion of said clutch housing being disposed adjacent said outer periphery;

said second portion of said clutch housing being disposed at a distance from said pressure plate and adjacent said counter pressure plate;

said second portion of said clutch housing extending in the axial direction from said first side of said counter pressure plate toward said second side of said counter pressure plate;

said first and second portions of said clutch housing comprising an integral, unitary, one-piece structure;

at least one fastening element being disposed through said clutch housing and into said counter pressure plate; and said clutch housing and said counter pressure plate being configured and disposed to comprise a pre-assembled unit.

2. The friction clutch according to claim 1 wherein said second portion of said clutch housing is in contact with and fastened to at least one of said second side of said counter-pressure plate and said outer periphery of said counter-pressure plate.

3. The friction clutch according to claim 2 wherein:

said second portion of said clutch housing comprises a substantially ring-shaped wall;

said second portion of said clutch housing comprises at least one passage;

said second centrifugal mass comprises at least one recess to receive said at least one fastening element;

said at least one fastening element is disposed through a corresponding one of said at least one passage and into a corresponding one of said at least one recess in said second centrifugal mass to attach said pre-assembled unit to said second centrifugal mass;

said first centrifugal mass comprises at least one opening; and said at least one opening in said first centrifugal mass is axially aligned with both a corresponding one of said at least one passage in said clutch housing and a corresponding one of said at least one recess in said second centrifugal mass.

4. The friction clutch according to claim 3 wherein:

said clutch housing comprises a third portion;

said third portion is disposed adjacent a portion of said pressure plate;

said third portion is disposed adjacent said first portion in the axial direction;

said friction clutch comprises a retaining element; and said retaining element is disposed and configured to adjustably connect said third portion of said clutch housing to said first portion of said clutch housing.

5. The friction clutch according to claim 4 wherein:

said biasing structure comprises an elastic element;

said friction clutch comprises at least one rivet;

said pressure plate comprises at least one hole to receive a corresponding one of said at least one rivet;

said at least one hole has a first inner diameter adjacent said elastic element;

said at least one hole has a second inner diameter at a distance from said elastic element greater than the distance of said first inner diameter from said elastic element;

said at least one rivet comprises:

a shank;

said shank being configured to expand upon installation of said at least one rivet; and a rivet head;

said shank of said at least one rivet is disposed in a corresponding one of said at least one hole.

6. The friction clutch according to claim 5 wherein:

said at least one rivet is a first at least one rivet;

said at least one fastening element comprises a second at least one rivet;

said second at least one rivet comprises:
 a shank;
  said shank being configured to expand upon installation of said second at least one rivet; and
 a rivet head;

said pre-assembled unit comprises at least one depression;

said at least one depression has a first inner diameter adjacent said first centrifugal mass;

said at least one depression has a second inner diameter at a distance further from said first centrifugal mass than said first inner diameter;

said second inner diameter is greater than said first inner diameter; and said shank of said second at least one rivet is disposed in a corresponding one of said at least one depression.

7. The friction clutch according to claim 5 wherein:

said pre-assembled unit comprises at least one threaded opening;

said at least one fastening element comprises at least one screw;

said at least one recess comprises a threaded opening;

said at least one screw is disposed in said threaded opening to connect said pre-assembled unit to said second centrifugal mass.

8. A friction clutch for a transmission of a motor vehicle, said friction clutch comprising:

a first centrifugal mass to be connected to a motor vehicle drive;

a second centrifugal mass;

said second centrifugal mass being rotatable with respect to said first centrifugal mass;

a clutch housing;

said clutch housing being disposed on said second centrifugal mass;

a clutch disc disposed within said housing, said clutch disc defining an axis of rotation and an axial direction parallel to the axis of rotation;

said clutch disc having first and second sides;

a pressure plate;

said pressure plate being disposed within said clutch housing and being movable in the axial direction to apply an axial force to said clutch disc;

a biasing structure to bias said pressure plate with respect to said clutch disc;

said pressure plate being disposed adjacent said first side of said clutch disc;

a counter pressure plate;

said counter pressure plate having first and second sides;

said first side of said counter pressure plate being disposed adjacent said second side of said clutch disc;

said second side of said counter pressure plate being disposed opposite said first side of said counter pressure plate and said clutch disc;

said clutch housing comprising first and second portions;

said first portion of said clutch housing being disposed adjacent said pressure plate and a distance from said counter pressure plate;

said second portion of said clutch housing being disposed at a distance from said pressure plate and adjacent said counter pressure plate;

said second portion of said clutch housing extending axially from said first side of said counter pressure plate toward said second side of said counter pressure plate;

at least one fastening element being disposed through said clutch housing and into said counter pressure plate; and said clutch housing and said counter pressure plate being configured and disposed to comprise a pre-assembled unit.

9. The friction clutch according to claim 8 wherein:

said second portion of said clutch housing comprises at least one passage;

said second centrifugal mass comprises at least one recess to receive said at least one fastening element; and said at least one fastening element is disposed through said at least one passage and into said at least one recess in said second centrifugal mass to attach said pre-assembled unit to said second centrifugal mass.

10. The friction clutch according to claim 9 wherein:

said first centrifugal mass comprises at least one opening; and said at least one opening in said first centrifugal mass is axially aligned with both said at least one passage in said clutch housing and said at least one recess in said second centrifugal mass.

11. The friction clutch according to claim 10 wherein:

said clutch housing comprises a third portion;

said third portion is disposed adjacent a portion of said pressure plate;

said third portion is disposed adjacent said first portion in the axial direction;

said friction clutch comprises a retaining element; and said retaining element is disposed and configured to adjustably connect said third portion of said clutch housing to said first portion of said clutch housing.

12. The friction clutch according to claim 11 wherein:

said biasing structure comprises an elastic element;

said friction clutch comprises at least one rivet;

said pressure plate comprises at least one hole to receive said at least one rivet;

said at least one hole has a first inner diameter adjacent said elastic element;

said at least one hole has a second inner diameter at a distance from said elastic element greater than the distance of said first inner diameter from said elastic element;

said at least one rivet comprises:
 a shank;
  said shank being configured to expand upon installation of said at least one rivet; and
 a rivet head;

said shank of said at least one rivet is disposed in said at least one hole.

13. The friction clutch according to claim 12 wherein:

said at least one rivet is a first at least one rivet;

said at least one fastening element comprises a second at least one rivet;

said second at least one rivet comprises:
 a shank;
  said shank being configured to expand upon installation of said second at least one rivet; and a rivet head;

said pre-assembled unit comprises at least one depression;

said at least one depression has a first inner diameter adjacent said first centrifugal mass;

said at least one depression has a second inner diameter at a distance further from said first centrifugal mass than said first inner diameter;

said second inner diameter is greater than said first inner diameter; and said shank of said second at least one rivet is disposed in said at least one depression.

14. The friction clutch according to claim 12 wherein:

said pre-assembled unit comprises at least one threaded opening;

said at least one fastening element comprises at least one screw;

said at least one recess comprises a threaded opening;

said at least one screw is disposed in said threaded opening to connect said pre-assembled unit to said second centrifugal mass.

15. The friction clutch according to claim 12 comprising one of a) and b):

a) said at least one rivet being a first at least one rivet;

said at least one fastening element comprising a second at least one rivet;

said second at least one rivet comprising:
a shank;
said shank being configured to expand upon installation of said second at least one rivet; and
a rivet head;

said pre-assembled unit comprising at least one depression;

said at least one depression having a first inner diameter adjacent said first centrifugal mass;

said at least one depression having a second inner diameter at a distance further from said first centrifugal mass than said first inner diameter;

said second inner diameter being greater than said first inner diameter; and said shank of said second at least one rivet being disposed in said at least one depression; and b) said pre-assembled unit comprising at least one threaded opening;

said at least one fastening element comprising at least one screw;

said at least one recess comprising a threaded opening;

said at least one screw being disposed in said threaded opening to connect said pre-assembled unit to said second centrifugal mass.

16. A friction clutch for a transmission of a motor vehicle, said friction clutch comprising:

a first centrifugal mass to be connected to a motor vehicle drive;

a second centrifugal mass;

said second centrifugal mass being rotatable with respect to said first centrifugal mass;

a clutch housing;

said clutch housing being disposed on said second centrifugal mass;

a clutch disc disposed within said housing, said clutch disc defining an axis of rotation and an axial direction parallel to the axis of rotation;

said clutch disc having first and second sides;

a pressure plate;

said pressure plate being disposed within said clutch housing and being movable in the axial direction to apply an axial force to said clutch disc;

a biasing structure to bias said pressure plate with respect to said clutch disc;

said pressure plate being disposed adjacent said first side of said clutch disc;

a counter pressure plate;

said counter pressure plate having first and second sides;

said first side of said counter pressure plate being disposed adjacent said second side of said clutch disc;

said clutch housing comprising first and second portions;

said first portion of said clutch housing being disposed adjacent said pressure plate and a distance from said counter pressure plate;

said second portion of said clutch housing being disposed at a distance from said pressure plate and adjacent said counter pressure plate;

said second portion extending from said first side of said counter pressure plate toward said second side of said counter pressure plate;

said first and second portions of said clutch housing comprising an integral, unitary clutch housing;

said clutch housing and said counter pressure plate being configured and disposed to comprise a pre-assembled unit;

said clutch housing comprising a third portion; and said third portion being disposed along said second side of said counter pressure plate to aid in holding said clutch housing and said counter pressure plate together as a pre-assembled unit.

17. The friction clutch according to claim 16 comprising:

at least one fastening element to fasten said third portion of said clutch housing to said pre-assembled unit;

said at least one fastening element being disposed through said third portion of said clutch housing and extending into said counter pressure plate;

said at least one fastening element being disposed substantially in said axial direction;

a second at least one fastening element to connect said second portion of said clutch housing to said preassembled unit;

said second at least one fastening element being disposed through said second portion of said clutch housing and into said counter pressure plate; and said second at least one fastening element being disposed substantially transverse to said axial direction.

18. The friction clutch according to claim 17 wherein:

said third portion of said clutch housing comprises at least one passage;

said second centrifugal mass comprises at least one recess to receive said at least one fastening element;

said at least one fastening element is disposed through said at least one passage and extends into said at least one recess in said second centrifugal mass to attach said pre-assembled unit to said second centrifugal mass;

said first centrifugal mass comprises at least one opening; and said at least one opening in said first centrifugal mass is axially aligned with both said at least one passage in said clutch housing and said at least one recess in said second centrifugal mass.

19. The friction clutch according to claim 18 wherein:

said clutch housing comprises a fourth portion;

said fourth portion is disposed adjacent a portion of said pressure plate;

said fourth portion is disposed adjacent said first portion in the axial direction;

said friction clutch comprises a retaining element;

said retaining element is disposed and configured to adjustably connect said fourth portion of said clutch housing to said first portion of said clutch housing.

20. The friction clutch according to claim 19 wherein:

said biasing structure comprises an elastic element;

said friction clutch comprises at least one rivet;

said pressure plate comprises at least one hole to receive said at least one rivet;

said at least one hole has a first inner diameter adjacent said elastic element;

said at least one hole has a second inner diameter at a distance from said elastic element greater than the distance of said first inner diameter from said elastic element;

said at least one rivet comprises:
 a shank;
 said shank being configured to expand upon installation of said at least one rivet; and
 a rivet head;

said shank of said at least one rivet is disposed in said at least one hole.

* * * * *

UNITED STATES PATENT AND TRADEMARK OFFICE
CERTIFICATE OF CORRECTION

PATENT NO. : 5,711,406
DATED : January 27, 1998
INVENTOR(S) : Joachim LINDNER and Bernhard SCHIERLING It is certified that error appears in the above-identified patent and that said Letters Patent is hereby corrected as shown below:

In column 1, line 10, after 'apparatus', delete "fop" and insert --for--.

Signed and Sealed this

Ninth Day of June, 1998

Attest:

BRUCE LEHMAN

Attesting Officer

Commissioner of Patents and Trademarks